(12) United States Patent
Zhang et al.

(10) Patent No.: US 11,252,439 B2
(45) Date of Patent: Feb. 15, 2022

(54) FLEXIBLE TREE PARTITION AND REPRESENTATION FOR POINT CLOUD CODING

(71) Applicant: TENCENT AMERICA LLC, Palo Alto, CA (US)

(72) Inventors: Xiang Zhang, Palo Alto, CA (US); Wen Gao, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/085,395

(22) Filed: Oct. 30, 2020

(65) Prior Publication Data
US 2021/0250618 A1    Aug. 12, 2021

Related U.S. Application Data (60) Provisional application No. 62/972,161, filed on Feb. 10, 2020.

(51) Int. Cl.
| | | |
|---|---|---|
| *H04N 19/70* | (2014.01) | |
| *H04N 19/119* | (2014.01) | |
| *H04N 19/136* | (2014.01) | |
| *H04N 19/184* | (2014.01) | |
| *H04N 19/96* | (2014.01) | |

(52) U.S. Cl.
CPC .......... *H04N 19/70* (2014.11); *H04N 19/119* (2014.11); *H04N 19/136* (2014.11); *H04N 19/184* (2014.11); *H04N 19/96* (2014.11)

(58) Field of Classification Search
CPC .... H04N 19/70; H04N 19/119; H04N 19/136; H04N 19/184; H04N 19/96
See application file for complete search history.

(56) References Cited

U.S. PATENT DOCUMENTS

2017/0347122 A1*  11/2017  Chou ................... H04N 19/36
2021/0105313 A1*  4/2021   Wang ................... H04L 65/80

FOREIGN PATENT DOCUMENTS

WO    WO-2020248562 A1 * 12/2020 ............. H04N 19/85

OTHER PUBLICATIONS

"Information technology—MPEG-I (Coded Representation of Immersive Media)—Part 9: Geometry-based Point Cloud Compression", ISO/IEC 23090-9:2019(E), 2019, 104 pages.
Khaled Mammou et al., "G-PCC codec description v2", International Organisation for Standardisation Organisation Internationale De Normalisation ISO/IEC JTC1/SC29/WG11 Coding of Moving Pictures and Audio, Jan. 2019, ISO/IEC JTC1/SC29/WG11 N18189, 39 pages.

(Continued)

*Primary Examiner* — Jae N Noh
(74) *Attorney, Agent, or Firm* — Sughrue Mion, PLLC (57) ABSTRACT

A method of decoding encoded information of a point cloud may be performed by at least one processor and comprises: obtaining an encoded bitstream, the encoded bitstream including encoded information of a point cloud including a set of points in a three-dimensional space; and determining a type of partitioning used to encode the information of the point cloud by at least one of parsing signals of at least three binary syntaxes or inferring at least one syntax of the at least three binary syntaxes.

20 Claims, 9 Drawing Sheets

(56) References Cited

OTHER PUBLICATIONS

Christian Tulvan et al., "Use Cases for Point Cloud Compression (PCC)", International Organisation for Standardisation Organisation Internationale De Normalisation ISO/IEC JTC1/SC29/WG11 Coding of Moving Pictures and Audio, Jun. 2016, ISO/IEC JTC1/SC29/WG11 MPEG2015/N16331, 8 pages.

Rufael Mekuria et al., "Requirements for Point Cloud Compression", International Organisation for Standardisation Organisation Internationale De Normalisation ISO/IEC JTC1/SC29/WG11 Coding of Moving Pictures and Audio, Feb. 2016, ISO/IEC JTC1/SC29/WG11 MPEG2016/n16330, 3 pages.

* cited by examiner

FLEXIBLE TREE PARTITION AND REPRESENTATION FOR POINT CLOUD CODING

CROSS-REFERENCE TO RELATED APPLICATION(S)

This application is based on and claims priority under 35 U.S.C. § 119 to U.S. Provisional Patent Application No. 62/972,161, filed Feb. 10, 2020, in the U.S. Patent & Trademark Office, the disclosure of which is incorporated by reference herein in its entirety.

BACKGROUND

Point cloud modeling has been widely used in recent years. For example, it is used in autonomous driving vehicles for object detection and localization, in geographic information systems (GIS) for mapping, and in cultural heritage projects to visualize and archive cultural heritage objects and collections, etc.

Point clouds contain a set of high dimensional points, typically of three dimensions (3D), each including 3D positional information and additional attributes such as color, reflectance, etc. The high dimensional points can be captured using multiple cameras and depth sensors, via Light Detection and Ranging (LIDAR) in various setups, and may be made up of thousands to billions of points, thereby allowing realistic representations of original scenes.

Compression technologies are needed to reduce the amount of data required to represent a point cloud for faster transmission and/or storage reduction. As explained in Non-Patent Literature 1 and Non-Patent Literature 2, the Moving Picture Experts Group (MPEG), a working group of the International Organization for Standardization (ISO) and the International Electrotechnical Commission (IEC), has created a joint technical committee (JTC 1/SC 29/WG 11) and an ad-hoc group (MPEG-PCC) to standardize compression techniques for static and/or dynamic point clouds.

Non-Patent Literature 1: Use Cases for Point Cloud Compression, ISO/IEC JTC1/SC29 WG11 Doc. N16331, Geneva, CH, June 2016.

Non-Patent Literature 2: Requirements for Point Cloud Compression, ISO/IEC JTC1/SC29 WG11 Doc. N16330, Geneva, CH, June 2016.

SUMMARY

The present disclosure is directed toward Point Cloud Coding (PCC). As described herein, flexible tree partitioning representation and coding are elaborated on, e.g., for the purpose of point cloud compression.

According to an aspect of the disclosure, a method of decoding encoded information of a point cloud may be performed by at least one processor and may comprise: obtaining an encoded bitstream, the encoded bitstream including encoded information of a point cloud including a set of points in a three-dimensional space; and determining a type of partitioning used to encode the information of the point cloud by at least one of parsing signals of at least three binary syntaxes or inferring at least one syntax of the at least three binary syntaxes.

According to a further aspect of the disclosure, the at least three binary syntaxes may indicate whether partitioning is applied on X, Y, and Z axes.

According to a further aspect of the disclosure, the method may further comprise: obtaining a node size of an object of the partitioned point cloud, wherein the determining the type of partitioning may be performed by inferring the at least three binary syntaxes based on the node size of the object.

According to a further aspect of the disclosure, the determining the type of partitioning may be performed by at least one of the following further operations: parsing signals of two additional binary syntaxes and inferring the additional binary syntaxes.

According to a further aspect of the disclosure, the type of partitioning of the point cloud may be selected using the following formula: $\hat{p}=\arg\min_{\top p} \{D(p)+\lambda \cdot R(p)\}$, wherein where p indicates a tree partition mode, D(p) is a distortion function, R(p) is a rate function, $\lambda$ is a Laplacian coefficient, and $\hat{p}$ is a tree partition mode.

According to a further aspect of the disclosure, the determining of the type of partitioning may be performed by parsing one of the at least three binary syntaxes and inferring two of the at least three binary syntaxes.

According to a further aspect of the disclosure, the determining the type of partitioning may include inferring a partitioning type of a descendant node of the partitioned point cloud.

According to a further of the disclosure, an apparatus for coding information of a point cloud may comprise: at least one memory configured to store program code; and at least one processor configured to access the at least one memory and operate according to the computer program code; the computer program code may comprise: first obtaining code configured to obtain an encoded bitstream, the encoded bitstream including encoded information of a point cloud including a set of points in a three-dimensional space; and determining code configured to determine a type of partitioning used to encode the information of the point cloud by at least one of parsing signals of at least three binary syntaxes or inferring at least one syntax of the at least three binary syntaxes.

According to a further aspect of the disclosure the at least three binary syntaxes may indicate whether partitioning is applied on X, Y, and Z axes.

According to a further aspect of the disclosure the computer program code may further comprise: second obtaining code configured to obtain a node size of an object of the partitioned point cloud, wherein the determining code is further configured to determine the type of partitioning by inferring the at least three binary syntaxes based on the node size of the object.

According to a further aspect of the disclosure, the determining code may be further configured to determine the type of partitioning by at least one of the following operations: parsing signals of two additional binary syntaxes and inferring the additional binary syntaxes.

According to a further aspect of the disclosure, the type of partitioning of the point cloud may be selected using the following formula: $\hat{p}=\arg\min_{\top p} \{D(p)+\lambda \cdot R(p)\}$, wherein where p indicates a tree partition mode, D(p) is a distortion function, R(p) is a rate function, $\lambda$ is a Laplacian coefficient, and $\hat{p}$ is a tree partition mode.

According to a further aspect of the disclosure, the determining code may be configured to determine the type of partitioning by parsing one of the at least three binary syntaxes and inferring two of the at least three binary syntaxes.

According to an aspect of the disclosure a non-transitory computer-readable storage medium may instructions that cause at least one processor to: obtain an encoded bitstream, the encoded bitstream including encoded information of a point cloud including a set of points in a three-dimensional space; and determine a type of partitioning used to encode the information of the point cloud by at least one of parsing signals of at least three binary syntaxes or inferring at least one syntax of the at least three binary syntaxes.

DETAILED DESCRIPTION

Point-Cloud Compression in Test Model 13 (TMC13) in MPEG

As described in Non-Patent Literature 3 and Non-Patent Literature 4, in the Test Model 13 (TMC13) codec, promulgated by the MPEG, geometry information and associated attributes, such as color or reflectance, of points of a point cloud, are separately compressed. The geometry information, e.g., 3D coordinates of the points, is coded by octree-partitioning with occupancy information. The attributes are then compressed based on reconstructed geometry using prediction, lifting and region adaptive hierarchical transform techniques. The octree-partitioning and occupancy encoding processes are described in more detail below.

Non-Patent Literature 3: G-PCC Codec description, ISO/IEC JTC1/SC29/WG11, Doc. N18891, October 2019.

Non-Patent Literature 4: Text of ISO/IEC CD 23090-9 Geometry-based Point Cloud Compression, ISO/IEC JTC1/SC29 WG11 Doc. N18478, Geneva, July 2019.

Octree Partitioning

Figure 1:
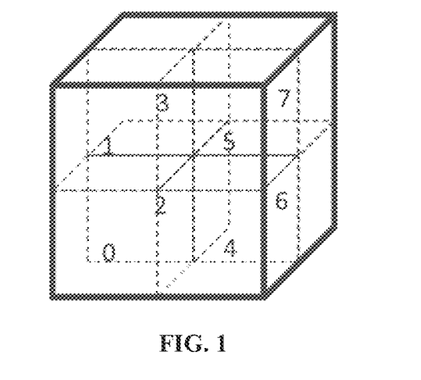
FIG. 1 is an illustration of an octree partition in three-dimensional space.

In TMC13, if an octree geometry codec is used, the geometry encoding proceeds as follows: First, a cubical axis-aligned bounding box B is defined by two points (0,0,0) and $(2^{M-1}, 2^{M-1}, 2^{M-1})$, where $2^{M-1}$ defines the size of B and M is specified in the bitstream. An octree structure is then built by recursively subdividing B. At each stage, a cube is subdivided into 8 sub-cubes. An 8-bit code, namely the occupancy code, is then generated by associating a 1-bit value with each sub-cube in order to indicate whether it contains points (i.e., whether it is full and has a value of 1) or not (i.e., whether it is empty and has a value of 0). Only full sub-cubes with a size greater than 1 (i.e., non-voxels) are further subdivided. FIG. 1 presents an illustration of an octree-partition in 3D space.

Figure 2:
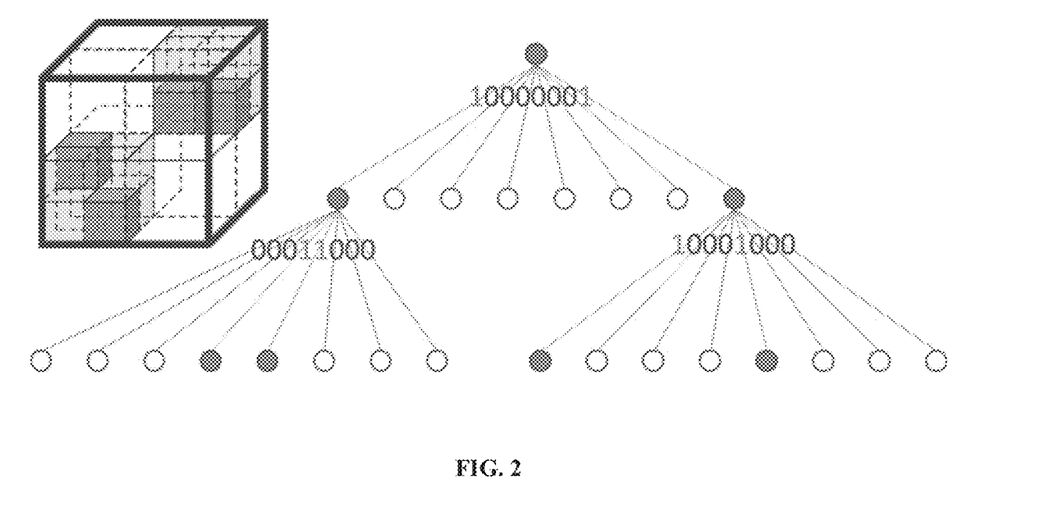
FIG. 2 is an illustration of an octree-partition and tree structure.

An example of two-level octree partition and the corresponding occupancy code are shown in FIG. 2, where cubes and nodes in dark indicate that they are occupied by points.

Encoding of Occupancy Code

The occupancy code of each node is then compressed by an arithmetic encoder. The occupancy code can be denoted as S, which is an 8-bit integer, and each bit in S indicates the occupancy status of each child node. Two encoding methods for occupancy code exist in TMC13: bit-wise encoding and byte-wise encoding. Bit-wise encoding is enabled by default. Both methods perform arithmetic coding with context modeling to encode the occupancy code, and the context status is initialized at the beginning of the coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of a current node.

For byte-wise encoding, S is encoded by referring to:
an adaptive look up table (A-LUT), which keeps track of the N (e.g., 32) most frequent occupancy codes, and
a cache which keeps track of the last different observed M (e.g., 16) occupancy codes.

A binary flag indicating whether S is the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index is encoded by using a binary arithmetic encoder. Otherwise, if S is not in the cache, then the binary representation of S is encoded by using a binary arithmetic encoder.

The decoding process starts by parsing dimensions of the bounding box B from the bitstream. The same octree structure is then built by subdividing B according to the decoded occupancy codes.

Still, these methods and techniques have room for improvement, primarily in terms of flexible tree partitioning representation, which is discussed below (for purposes of point cloud compression).

The proposed methods and apparatuses may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. Further, the disclosures herein are not limited to uses related to TMC13 software or the MPEG-PCC standard.

Flexible Tree Partition

According to embodiments described herein, methods and techniques of tree partitioning are disclosed.

According to embodiments and disclosed techniques, a node (e.g., a cube in 3D space) in a tree structure can be split in different forms, including but not limited to the following: quad-tree partitioning, binary-tree partitioning, symmetric partitioning, asymmetric partitioning, hybrid partitioning, and flexible partitioning.

Symmetric Partitions

Symmetric oct-tree (OT) partitioning is described as follows. As shown in FIG. 1, a cube in 3D space can be divided into 8 sub-cubes (having the same size) by 3 planes perpendicular to x, y, and z axes, respectively. That is, partition may be applied along x, y, z axes.

Figure 3:
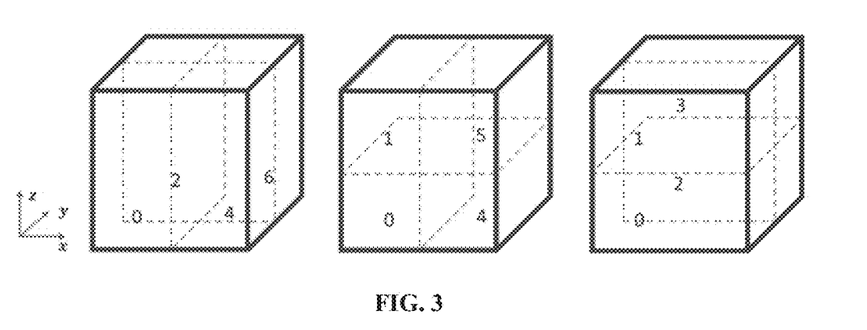
FIG. 3 is an illustration of a quad-tree partition of a three-dimensional cube.

Symmetric quad-tree (QT) partitioning is described as follows. As shown in FIG. 3, a cube in 3D space can be divided into 4 sub-cubes (having the same size) by 2 perpendicular planes. That is, partitioning may be applied along two out of three axes.

Figure 4:
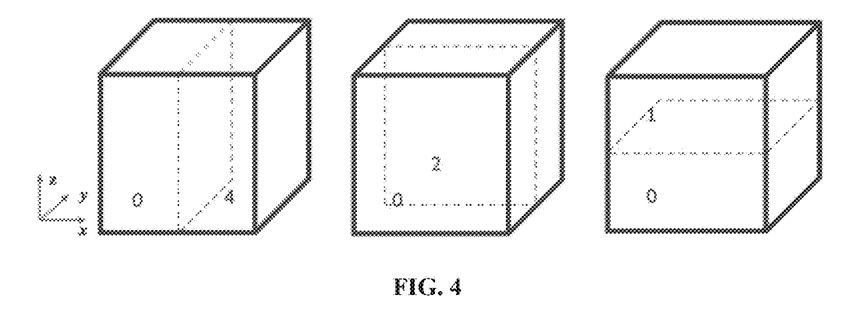
FIG. 4 is an illustration of a binary-tree partition of a three-dimensional cube.

Symmetric binary-tree (BT) partitioning is described as follows. As shown in FIG. 4, a cube in 3D can be divided into 2 sub-cubes (having the same size) by 1 plane perpendicular to one of the x, y, and z axis. That is, partitioning may be applied along one axis only.

Asymmetric Partitioning

Figure 5:
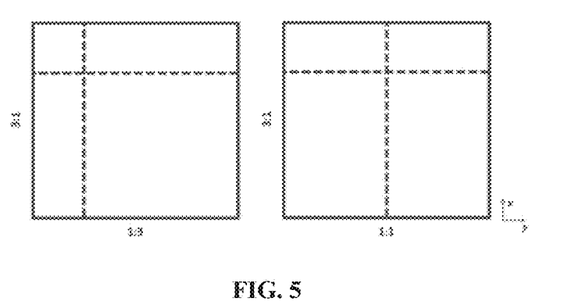
FIG. 5 is an illustration of an asymmetric partition in two-dimensional space.

According to embodiments, asymmetric partitioning can be applied when the partition position is not in the middle (e.g., other than the abovementioned symmetric partitions. 2D illustrations of asymmetric partitions are shown in FIG. 5. 3D asymmetric partitions may include the following:

Asymmetric OT partition. A cube in 3D space can be divided into 8 sub-cubes (having different sizes) by 3 planes perpendicular to x, y, and z axis respectively. The partition position along each axis may or may not be in the middle.

Asymmetric QT partition. A cube in 3D space can be divided into 4 sub-cubes (having different sizes) by 2 perpendicular planes. The partition position along each axis may or may not be in the middle.

Asymmetric BT partition. A cube in 3D space can be divided into 2 sub-cubes (having different sizes) by 1 plane perpendicular to one of x, y and z axis. The partition position may or may not be in the middle.

According to embodiments, typical partition ratios in asymmetric modes are 1:3 and 3:1, however, in other cases the partition ratio could be arbitrary, so long as the partitions are on integer positions. Constraints may be involved in asymmetric partitions, including but not limited to the following:

Asymmetric partitions may not be allowed only when the node size is within a specified range. For example, in some embodiments, a 2×2×2 cube or even a cube larger than 8×8×8 may not be applicable for asymmetric partitioning.

Asymmetric partitions may not be allowed when the node is a cube, e.g., a cube that can only be partitioned by a symmetric OT/QT/BT partition.

Hybrid Partitioning

Figure 6:
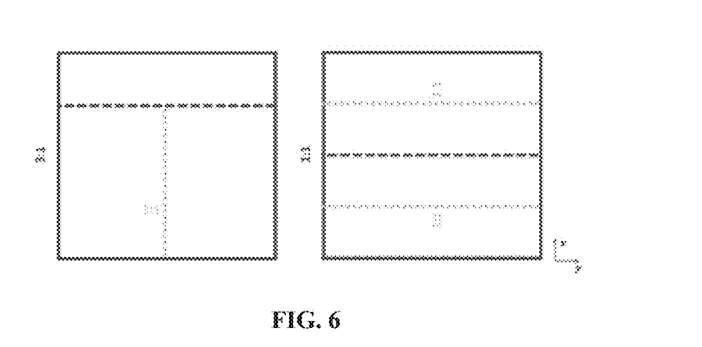
FIG. 6 is an illustration of a two-level hybrid partition in two-dimensional space.

According to embodiments, a node may be partitioned as if it has been divided multiple times at once, e.g., a node may be portioned via a hybrid partitioning scheme. A 2D illustration of a two-level hybrid partition scheme is shown in FIG. 6, where the two-levels indicate two sequential partitions. The left-hand side of FIG. 6 shows a case where an asymmetric BT partition (3:1) is applied along the x-axis and a symmetric BT partition (1:1) is then applied to the sub-node in a lower part along the y-axis. The right-hand side of FIG. 6 shows a case where a symmetric BT partition (1:1) is applied along the x-axis and two symmetric BT partitions (1:1) are then applied to the two sub-nodes along the x-axis again. The left-hand side of FIG. 6 can be interpreted as a triple-tree partition because it results in three sub-nodes, and the right-hand side of FIG. 6 can be interpreted as another form of quad-tree partitioning.

In 3D space, the combination of hybrid partitioning can be complicated. Therefore, simplifications and constraints may be involved, including but not limited to the following, Hybrid partitions higher than two-levels may not be allowed, this may indicate that a node can be partitioned two times, maximum, at once.

Limited combinations of partitioning may be allowed in hybrid partitions. One can predefine a group of hybrid partition modes that can be used.

Hybrid partitions may be allowed only when the node size is within a specified range. For example, a 2×2×2 cube or a cube larger than 8×8×8 may be not applicable for hybrid partitioning.

Hybrid partitions may be allowed only when the node is a cube, i.e., a rectangular cuboid may not be applicable for hybrid partitioning.

If a hybrid partition is equivalent to a non-hybrid partition, then this hybrid partition may be invalid. For example, if a symmetric OT partition is equivalent to a hybrid partition (a symmetric BT plus two symmetric QTs), then this type of hybrid partition may be invalid.

Representation of Flexible Tree Partitioning

Disclosed herein are techniques for flexible tree partitioning that provide for additivity, wherein a tree node can be flexibly partitioned. A preferred partition mode may be determined on an encoder-side by a rate-distortion optimization technique, where the preferred mode minimizes the cost function as below:

$$\hat{p} = \arg\min_{p} \{D(p) + \lambda \cdot R(p)\},$$

Here, p indicates a tree partition mode, D(p) and R(p) are distortion and rate functions in terms of p, λ is the Laplacian coefficient that balances between rate and distortion term, $\hat{p}$ is the preferred tree partition mode that minimizes the cost function. Note that the distortion function D(p) may include distortions of attributes if the attribute and geometry are encoded jointly. If the geometry coding is lossless, the distortion function can be eliminated because D(p) is always 0 in this case. The preferred partition mode p may then signaled by syntax elements in the bitstream.

According to embodiments, in order to efficiently encode the flexible tree structures, the splitting and occupancy information can be represented in binary forms. Note that the below disclosed syntaxes can be coded by bypassing or by entropy coding with context modeling.

Symmetric Partitioning

According to embodiments, in order to represent symmetric OT, QT and BT partitions, three binary syntax split_x, split_y and split_z may be signaled, indicating whether the partition is applied to the x, y, and z axis, respectively. The values determine the partition mode as follows:

TABLE 1

| Symmetric Partition Signaling | | | |
|---|---|---|---|
| split_x | split_y | split_z | Partition mode |
| 1 | 1 | 1 | Symmetric OT |
| 1 | 1 | 0 | Symmetric QT along x-y axes |
| 1 | 0 | 1 | Symmetric QT along x-z axes |

TABLE 1-continued

| Symmetric Partition Signaling | | | |
|---|---|---|---|
| split_x | split_y | split_z | Partition mode |
| 0 | 1 | 1 | Symmetric QT along y-z axes |
| 1 | 0 | 0 | Symmetric BT along x axis |
| 0 | 1 | 0 | Symmetric BT along y axis |
| 0 | 0 | 1 | Symmetric BT along z axis |

According to other embodiments, the syntaxes may be inferred, rather than explicitly signaled.

According to an embodiment, if a node size in one dimension is below a threshold, or satisfies a predefined condition, the splitting syntax along this dimension can be inferred. For example, if the node size is 4×4×1, the split_z can be inferred to be zero, because z dimension cannot be further divided.

According to an embodiment, if two out of three syntax elements are known as zeros, the last syntax element can be inferred to be equal to 1. For example, if split_x and split_y are signaled as zeros, split_z can be inferred to be 1, because they may not allowed to be 0 at the simultaneously.

According to an embodiment, if a node is a cube, only symmetric OT may be allowed, therefore split_x, split_y and split_z can be inferred as 1 without signaling.

According to an embodiment, the splitting syntaxes may be applied to the current node, its child nodes, its grandchild nodes, and even down to the leaf nodes. In this case, the splitting syntax elements of the descendant nodes can be inferred without explicit signaling.

According to an embodiment, after breadth-first coding of several partition depths, the remaining sub-nodes can be viewed as sub-trees. Each sub-tree can be split in different ways, therefore, splitting syntaxes may be signaled for each partition depth of each sub-tree.

According to an embodiment, the splitting syntaxes of the nodes in the same partition depth may be assumed to be equal, in which case, only one set of splitting syntaxes may be signaled for each partition depth.

According to an embodiment, the flexible partition modes may only be allowed when certain conditions are met, in which cases, the splitting syntaxes are not signaled. For example, flexible partition modes may be only allowed when the partition depth reaches a threshold. Thus, splitting syntaxes can be inferred to be 1 when the partition depth is below the threshold, indicating only the symmetric OT partition is allowed.

Asymmetric Partitioning

According to embodiments wherein asymmetric partitions are used, additional syntaxes, split_pos_x, split_pos_y, split_pos_z, specifying the partition positions may be used. The partition position may take up to 3 values, indicating whether the partition is symmetric (1:1) or asymmetric (1:3 or 3:1). Taking split_pos_x for example, if split_x is equal to 1, the partition ratio can be defined by two bits as follows:

TABLE 2

| Asymmetric Partition Signaling | |
|---|---|
| split_pos_x | Partition ratio |
| b0 | 1:1 (symmetric) |
| b10 | 1:3 (asymmetric) |
| b11 | 3:1 (asymmetric) |

According to embodiments, the first bit may indicate whether the partition is symmetric (1:1) or not, and the second bit may indicate whether the partition ratio is 1:3 or 3:1, and if the partition is asymmetric. If split_x is equal to 0, split_pos_x is not signaled. The same definitions may apply to split_pos_y and split_pos_z.

Embodiments also disclose techniques for inferring these syntaxes instead of explicitly signaling:

According to an embodiment, if a node size in one dimension is below a threshold or satisfies a predefined condition, the splitting syntax along this dimension may be inferred. For example, if the asymmetric partition is only allowed for node sizes smaller than or equal to 4, split_pos_x, split_pos_y, split_pos_z may not be signaled when the node size is larger than 4.

According to an embodiment, asymmetric partitions may not be allowed when the node is a cube, therefore in which case split_pos_x, split_pos_y, split_pos_z can be inferred as being equal to 0, without signaling.

According to an embodiment, the same splitting positions may be applied to the current node, its child nodes, and its grandchild nodes. Further, the splitting positions may even be applied to the leaf nodes, in which cases, the splitting syntaxes of the descendant nodes can be inferred without explicit signaling.

According to an embodiment the splitting syntaxes of the nodes in the same partition depth may be assumed to be equal, in which case, only one set of splitting syntaxes may be signaled for each partition depth.

According to an embodiment, the asymmetric partition modes may only be allowed when certain conditions are met, in which cases, the splitting position syntaxes may not be signaled when conditions are not met. For example, asymmetric partition modes may be only allowed when the partition depth reaches a threshold, thus splitting position syntaxes can be inferred to be equal to 0 when the partition depth is below the threshold, indicating that only the symmetric partitions are allowed.

Hybrid Partitioning

According to embodiments, hybrid partitioning can be signaled by a flag hybrid_split_flag and an index hybrid_split_index. If the hybrid_split_flag is equal to 1, hybrid_split_index may be signaled to indicate the hybrid partition mode referring to a predefined look-up table. If the hybrid_split_flag is set equal to 0, hybrid_split_index may not be signaled, and symmetric and (or) asymmetric partition modes may be signaled as described above. The look-up table, e.g., the mapping between hybrid_split_index and the hybrid partition mode may be as follows:

TABLE 3

| Hybrid Partition Signaling | |
|---|---|
| hybrid_split_index | Hybrid partition mode |
| b000 | Mode 0 |
| b001 | Mode 1 |
| ... | ... |
| b111 | Mode 7 |

Similar as to discussed above, according to embodiments, these syntaxes may be inferred in addition and/or to being signaled.

According to an embodiment, hybrid partitions may only be allowed when the node is a cube, therefore hybrid_ split_flag can be inferred as being equal to 0 and hybrid_split_index may not be signaled when the current node is a non-cube.

According to an embodiment, the same splitting positions may be applied to the current node, its child nodes, its grandchild nodes, and even the leaf nodes, in which cases, the splitting syntaxes of the descendant nodes can be inferred without explicit signaling.

According to an embodiment, the splitting syntaxes of the nodes in the same partition depth may be assumed to be equal, in which case, only one set of splitting syntaxes may be signaled for each partition depth.

According to an embodiment, some hybrid partition modes are not allowed when certain conditions are met, in which cases, the look-up table is shrinking, and bits can be saved from redundancies.

According to an embodiment, the signaling of hybrid partition modes and the other symmetric and asymmetric modes may be unified by a single look-up table, which may include all possible partition modes for a current node. In this case, only one index referring to the look-up table may be specified to indicate the partition mode.

Occupancy Coding in Flexible Tree Partitioning

The instant disclosure provides techniques wherein flexible tree partitioning may divide a node into less than eight sub-nodes and each sub-node may have different sizes. For example, an asymmetric QT partition in 3D may produce 4 sub-nodes with different sizes. Therefore according to embodiments, the occupancy code may not always be in 8-bits. If a node is divided into N sub-nodes, then the occupancy code is N-bits, where each bit represents whether the corresponding sub-node is occupied or empty. Different node sizes may have an impact on the context modeling in occupancy coding.

Figure 7:
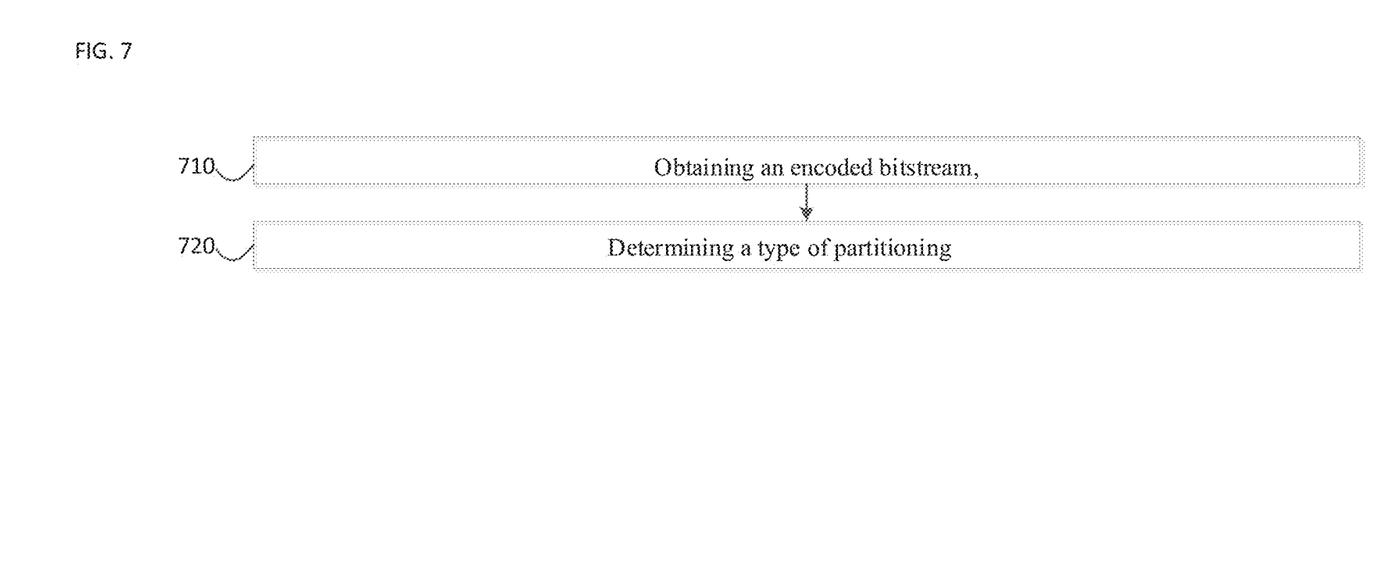
FIG. 7 is a flowchart of an example process for decoding encoded information of a point cloud

FIG. 7 is a flow chart of an example process 700 for decoding encoded information of a point cloud. In some implementations, one or more process blocks of FIG. 7 may be performed by user device 810. In some implementations, one or more process blocks of FIG. 7 may be performed by another device or a group of devices separate from or including user device 810, such as platform 820.

As shown in FIG. 7, process 700 may include obtaining an encoded bitstream, the encoded bitstream including encoded information of a point cloud including a set of points in a three-dimensional space (block 710).

The point cloud may be a set of points in a 3D space, each with associated attributes, e.g. color, material properties, etc.

As further shown in FIG. 7, process 700 may include determining a type of partitioning used to encode the information of the point cloud by at least one of parsing signals of at least three binary syntaxes or inferring at least one syntax of the at least three binary syntaxes. (block 720).

Figure 8:
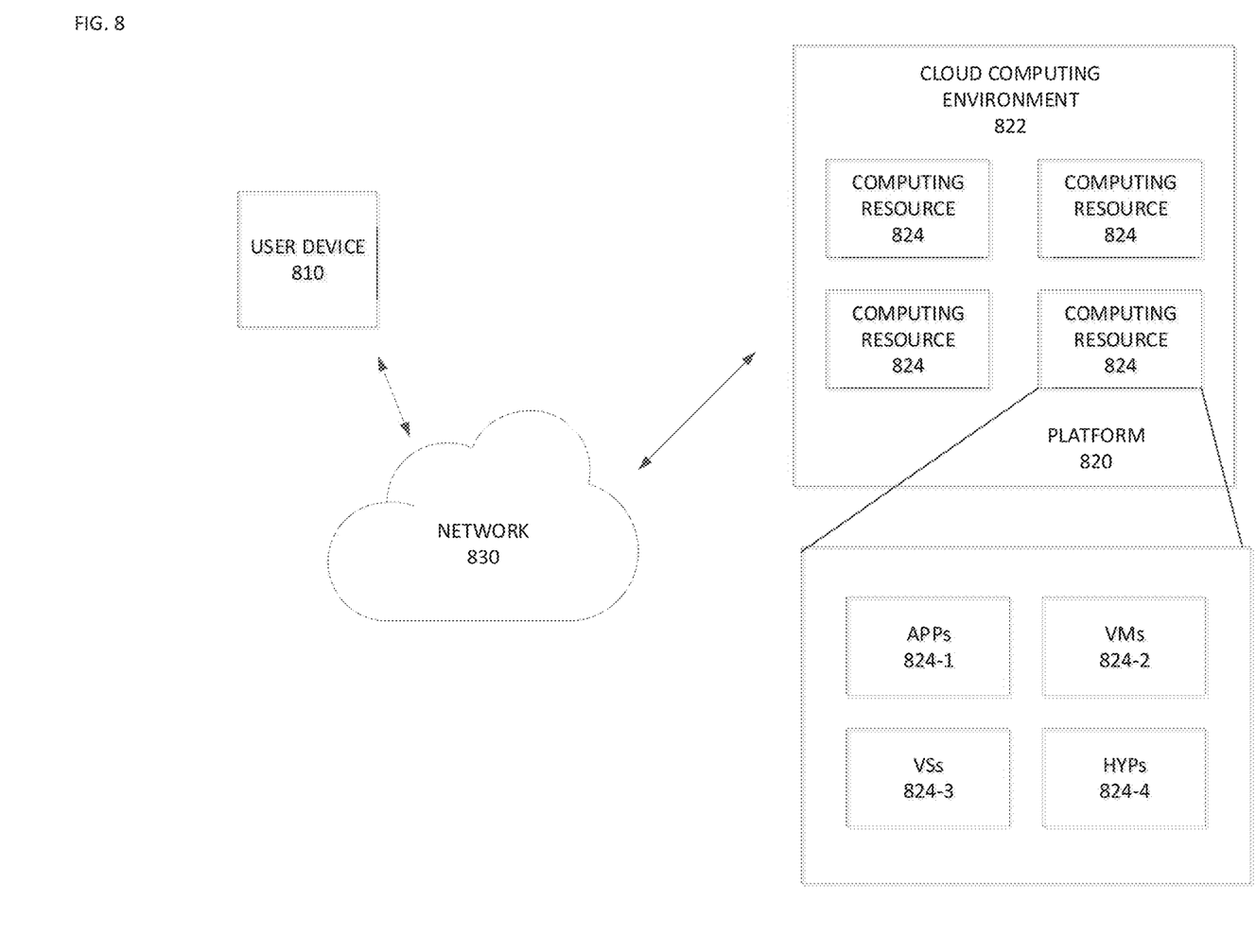
FIG. 8 is a diagram of an example environment in which systems and/or methods, described herein, may be implemented.

FIG. 8 is a diagram of an example communication system 800 in which systems and/or methods, described herein, may be implemented. As shown in FIG. 8, communication system 800 may include a user device 810, a platform 820, and a network 830. Devices of communication system 800 may interconnect via wired connections, wireless connections, or a combination of wired and wireless connections.

The communication system 800 may support unidirectional transmission of data. For example, a first user device 810 may code video data at a local location for transmission to a second user device 810 via the network 830. The second user device 810 may receive the coded video data of the first user device 810 from the network 830, decode the coded data and display the recovered video data. Unidirectional data transmission may be common in media serving applications, and the like.

The communication system 800 may support bidirectional transmission of data. For example, the communication system 800 may support bidirectional transmission of coded video that may occur, for example, during videoconferencing. For bidirectional transmission of data, each user device 810 may code video data captured at a local location for transmission to the other user device 810 via the network 830. Each user device 810 also may receive the coded video data transmitted by the other user device 810, may decode the coded data and may display the recovered video data at a local display device.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of providing information to user device 810, as described elsewhere herein. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 is not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc. services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
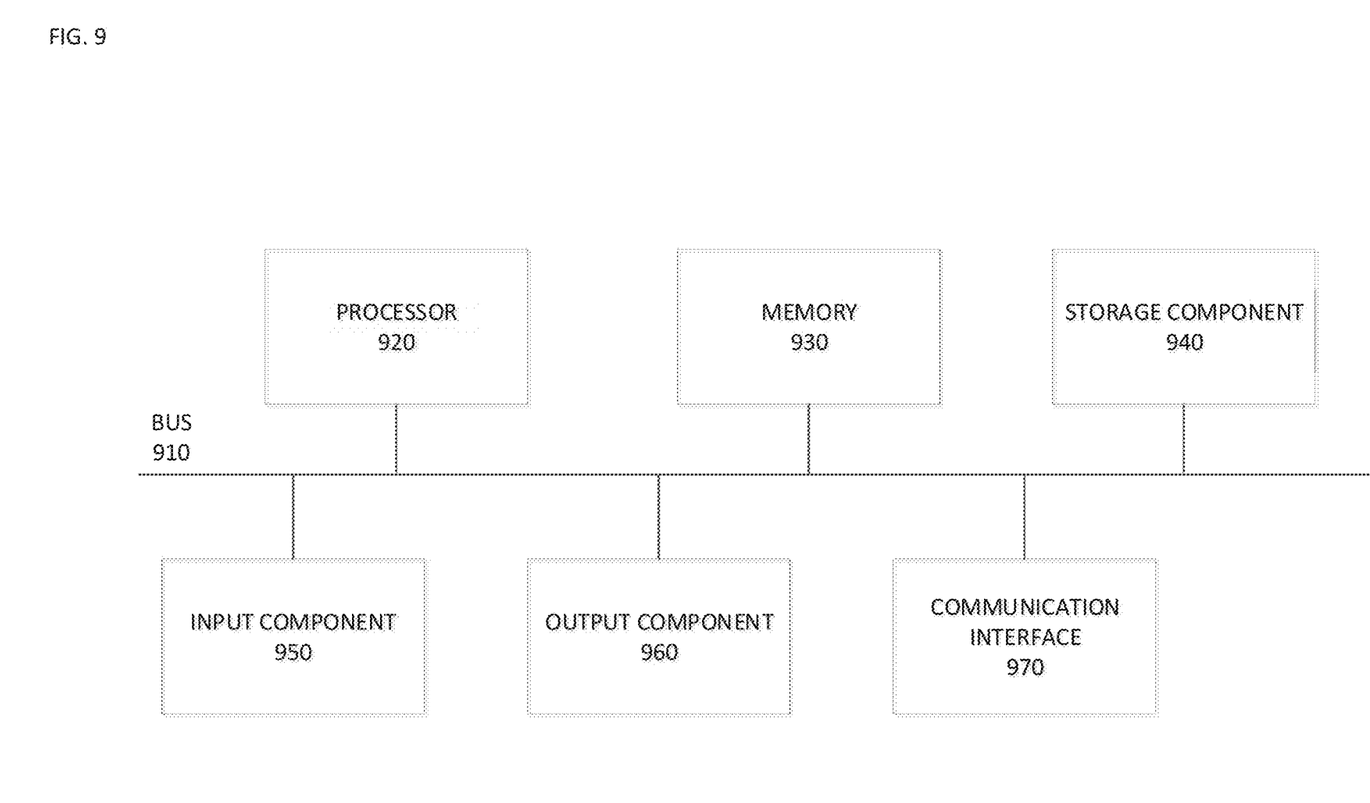
FIG. 9 is a diagram of example components of one or more devices of FIG. 8.

FIG. 9 is a diagram of example components of a device 900. Device 900 may correspond to user device 810 and/or platform 820. As shown in FIG. 8, device 900 may include a bus 910, a processor 920, a memory 930, a storage component 940, an input component 950, an output component 960, and a communication interface 970.

Bus 910 includes a component that permits communication among the components of device 900. Processor 920 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of decoding encoded information of a point cloud, the method performed by at least one processor and comprising:

obtaining an encoded bitstream, the encoded bitstream including encoded information of a point cloud including a set of points in a three-dimensional space; and determining a type of partitioning used to encode the information of the point cloud by at least one of parsing signals of at least three binary syntaxes or inferring at least one syntax of the at least three binary syntaxes.

2. The method of claim 1, wherein the at least three binary syntaxes indicate whether partitioning is applied on X, Y, and Z axes.

3. The method of claim 1, further comprising:

obtaining a node size of an object of the partitioned point cloud, wherein the determining the type of partitioning is performed by inferring the at least three binary syntaxes based on the node size of the object.

4. The method of claim 1, wherein the determining the type of partitioning is performed by at least one of the following further operations: parsing signals of two additional binary syntaxes and inferring the additional binary syntaxes.

5. The method of claim 4, wherein the additional binary syntaxes indicate whether the type of partitioning is symmetric and the partition ratio of the type of partitioning if the type of partitioning is asymmetric.

6. The method of claim 4, further comprising:

obtaining a node size of an object of the partitioned point cloud, wherein the determining the type of partitioning is performed by inferring the at least three binary syntaxes based on the node size of the object.

7. The method of claim 4, further comprising:

obtaining a node shape of an object of the partitioned point cloud, wherein the determining the type of partitioning is performed by inferring the at least three binary syntaxes based on the node shape of the object.

8. The method of claim 1, wherein the type of partitioning of the point cloud is selected using the following formula:

$$\hat{p} = \arg\min_{p} \{D(p) + \lambda \cdot R(p)\}$$

wherein where p indicates a tree partition mode, D(p) is a distortion function, R(p) is a rate function, $\lambda$ is a Laplacian coefficient, and $\hat{p}$ is a tree partition mode.

9. The method of claim 1, wherein the determining the type of partitioning is performed by parsing one of the at least three binary syntaxes and inferring two of the at least three binary syntaxes.

10. The method of claim 1, wherein the determining the type of partitioning includes inferring a partitioning type of a descendant node of the partitioned point cloud.

11. An apparatus for coding information of a point cloud, the apparatus comprising:

at least one memory configured to store program code; and at least one processor configured to access the at least one memory and operate according to the computer program code, the computer program code comprising:

first obtaining code configured to obtain an encoded bitstream, the encoded bitstream including encoded information of a point cloud including a set of points in a three-dimensional space; and determining code configured to determine a type of partitioning used to encode the information of the point cloud by at least one of parsing signals of at least three binary syntaxes or inferring at least one syntax of the at least three binary syntaxes.

12. The apparatus of claim 11, wherein the at least three binary syntaxes indicate whether partitioning is applied on X, Y, and Z axes.

13. The apparatus of claim 11, wherein the computer program code further comprises:

second obtaining code configured to obtain a node size of an object of the partitioned point cloud, wherein the determining code is further configured to determine the type of partitioning by inferring the at least three binary syntaxes based on the node size of the object.

14. The apparatus of claim 11, wherein the determining code is further configured to determine the type of partitioning by at least one of the following operations: parsing signals of two additional binary syntaxes and inferring the additional binary syntaxes.

15. The apparatus of claim 14, wherein the additional binary syntaxes indicate whether the type of partitioning is symmetric and the partition ratio of the type of partitioning if the type of partitioning is asymmetric.

16. The apparatus of claim 14, wherein the computer program code further comprises:

second obtaining code configured to obtain a node size of an object of the partitioned point cloud, wherein the determining code is configured to determine the type of partitioning by inferring the at least three binary syntaxes based on the node size of the object.

17. The apparatus of claim 14, wherein the computer program code further comprises: second obtaining code configured to obtain a node shape of an object of the partitioned point cloud, wherein the determining the type of partitioning is performed by inferring the at least three binary syntaxes based on the node shape of the object.

18. The apparatus of claim 11, wherein the type of partitioning of the point cloud is selected using the following formula:

$$\hat{p} = \arg\min_{p}\{D(p) + \lambda \cdot R(p)\}$$

wherein where p indicates a tree partition mode, D(p) is a distortion function, R(p) is a rate function, $\lambda$ is a Laplacian coefficient, and $\hat{p}$ is a tree partition mode.

19. The apparatus of claim 11, wherein the determining code is configured to determine the type of partitioning by parsing one of the at least three binary syntaxes and inferring two of the at least three binary syntaxes.

20. A non-transitory computer-readable storage medium storing instructions that cause at least one processor to:

obtain an encoded bitstream, the encoded bitstream including encoded information of a point cloud including a set of points in a three-dimensional space; and determine a type of partitioning used to encode the information of the point cloud by at least one of parsing signals of at least three binary syntaxes or inferring at least one syntax of the at least three binary syntaxes.

* * * * *